Sept. 24, 1935.  R. T. COOKE  2,015,618
RUBBER MIXING OR PREPARING MACHINE
Filed May 2, 1935   2 Sheets-Sheet 2

INVENTOR
Rupert T. Cooke,
BY
Richard E. Babcock
ATTORNEY

Patented Sept. 24, 1935

2,015,618

UNITED STATES PATENT OFFICE 2,015,618

RUBBER MIXING OR PREPARING MACHINE

Rupert Thomas Cooke, London, England, assignor to Francis Shaw and Company Limited, Bradford, Manchester, England, a British company Application May 2, 1935, Serial No. 19,528
In Great Britain June 14, 1934

6 Claims. (Cl. 18—2)

In the preparation of rubber for industrial purposes two types of preparing machines are commonly used viz. first, a mixing machine comprising two adjacent parallel rollers journalled in a frame and rotated at different peripheral speeds, between which the raw rubber, together with the usual ingredients require to adapt it to meet various purposes is fed and which deliver it in sheet form, the rollers having a milling and/or grinding action on the plastic mass which is thoroughly worked and the ingredients uniformly incorporated therewith. Such machines though comparatively slow are very effective, as the rubber is not unduly heated or otherwise distressed.

To expedite such preparatory treatment it is now common to use a second type of kneading machine wherein the plastic rubber and ingredients to be mixed therewith are fed into a kneading machine comprising a single or multiple vessel having rotating blades in a partially circular trough or troughs to provide a more rapid mastication or like treatment and incorporation of the ingredients to be mixed therewith. The blades so used act chiefly as impellers for carrying or forcing the rubber to smear it on the walls of the troughs containing the same, the screw like blades also effecting a compressive or kneading action. Such compressive or kneading action generates heat and results in greater stresses of the plastic rubber and the object of the present invention is to provide a rubber preparing machine having a combined kneading or compressive and milling action on the plastic rubber whereby the said rubber is treated and has any desired ingredients such as an accelerator or filling incorporated therewith as effectively as with an ordinary rubber mixing machine but with less labour and increased output without overheating and in which a more effective mixing and more homogeneous mass is obtained and less heat generated than is usual in rubber mixing machines of the kneading type.

According to the present invention a rubber preparing machine comprises two or more, usually two, rollers rotatably mounted in a casing and formed with raised surfaces of spiral or other formation and of comparatively large area, the peripheral face of said raised area being concentric or substantially concentric with the axis of the rollers for the whole or major portion of its area and with the circular walls of the casing and extending substantially to the reduced diameter of the body part of the other roller or rollers, said body part also being concentric or substantially concentric with the axis thereof, the arrangement being such that the outer periphery of said raised portions in their passage across the body part of adjacent rollers exert a milling action on the plastic mass whilst the contour of said raised surface is such as to exert an impelling action on the plastic mass to traverse it endwise of the same and to re-present it to the action of the rollers the resultant treatment being a combined milling and kneading action. The invention will be more particularly described by the aid of the accompanying drawings wherein:—

Figure 1:
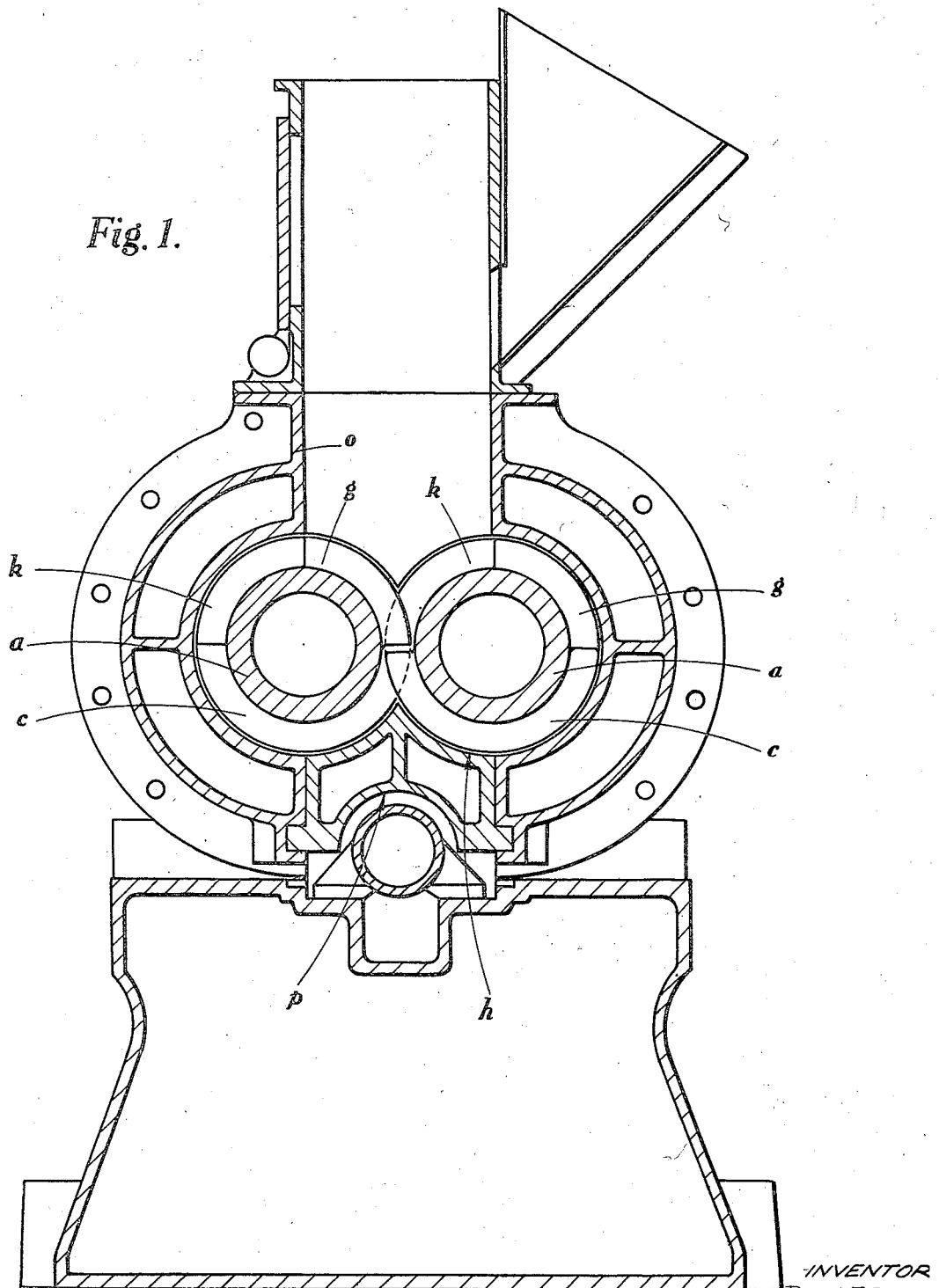
Figure 1 is an end view of a rubber mixing machine showing mixing elements constructed according to the present invention with the end wall of the casing removed.
Figure 2:
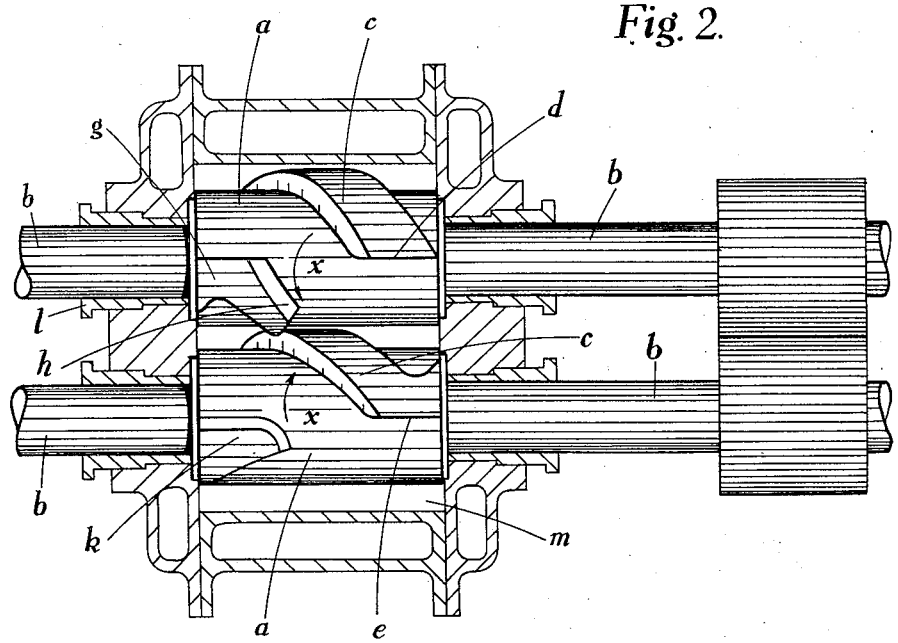
Figure 2 is a plan view of Figure 1 with the casing shown in section to expose fully the rollers whilst
Figure 3:
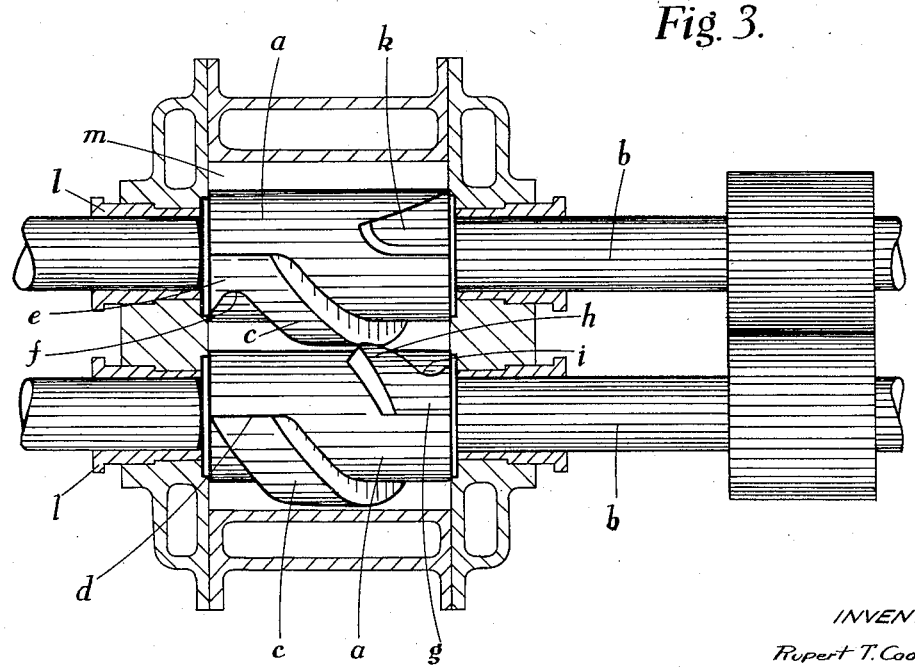
Figure 3 is a like view to Figure 1 but showing the rollers rotated through 180°.

Referring to the drawings two rollers, alike in all respects, and each comprising a body part $a$ are keyed, or otherwise secured to the spindles $b$. Each body $a$ is formed with a raised spiral $c$ having a comparatively wide peripheral face concentric with the axis and passing half way round the same, one end $d$ ending at one end of the roller whilst the other end $e$ extends to the opposite end of the roller on the diametrically opposite side where it is formed with a reverse curve $f$ to reverse the direction of traverse of the plastic mass, the side walls of the spiral $c$ being slightly tapered. A spiral scroll $g$ of shorter length terminating at $h$ is formed on the opposite half of each roller with a reverse curve $i$ located at the same end of the roller as the similarly shaped end of the scroll $c$ whilst at the other end of the roller but opposite to the plain end of the scroll $c$ is a raised spiral $k$ of smaller length, all the raised portions $c$, $g$ and $k$ terminating as straight lines for the whole or major part of the length of the ends or one end in substantially the same longitudinal plane passing through the axis of the roller.

The raised portions are of any desired height varying according to the size of the roll say ⅕ to ⅙ of the diameter of the body part or root but these dimensions may be varied within wide limits and the outer surface of all of them is concentric with the axis of the rotor with which the body $a$ is also concentric.

The spindles $b$ of the rollers $a$ which are rotated in the direction of the arrows $x$ by suitable gearing, are journalled in bearings $l$ in the partially circular troughs $m$, $m$ in the mixing chamber usually jacketted and constructed in known manner with an inlet *o* at the top for the admission of the rubber and mixing and a sliding door *p* at the bottom for emptying the same, the rollers *a* being arranged in reverse order end to end relatively to each other as will be clearly seen from the drawings so that the raised portions on one roll rotate in the depressions in the other roll whereby the desired milling and kneading effect is obtained.

In practice very good results have been obtained with the raised rolling surfaces forming substantially one third the area of the body surface of each roller but it is to be understood that the relative proportions and shape of the parts may be varied within limits the essential feature being the formation of interacting raised and depressed portions on the rollers the peripheral surface of which are concentric or substantially concentric with the axis of the rollers and so shaped relatively to each other that the plastic mass is automatically maintained within the influence of the rotors whereby the combined milling and kneading action takes place continuously until the mixing or other treatment is finished, a more homogeneous mass being obtained with less generation of heat than heretofore.

Having now particularly described and ascertained the nature of my said invention and in what manner the same is to be performed, I declare that what I claim is:—

1. Rubber preparing machinery comprising a casing, a plurality of rollers rotatably mounted in said casing and formed with raised surfaces of comparatively large area the peripheral face of said raised area being substantially concentric with the axis of the rollers for the whole or major portion of its area and with the circular walls of the casing and extending substantially to the reduced diameter of the body part of the rollers said body part also being substantially concentric with the axis thereof the arrangement being such that the outer periphery of said raised portions in their passage across the body part of the adjacent roller exerts a milling action on the plastic mass whilst the contour of the raised portion produces a kneading action, substantially as described.

2. Rubber preparing machinery comprising a casing a plurality of rollers rotatably mounted in said casing and formed with raised surfaces in the form of spirals extending substantially from end to end of the rollers and of comparatively large area the peripheral face of said raised area being substantially concentric with the axis of the rollers for the whole or major portion of its area and with the circular walls of the casing and extending substantially to the reduced diameter of the body part of the rollers said body part also being substantially concentric with the axis thereof the arrangement being such that the outer periphery of said raised portions in their passage across the body part of the adjacent roller exerts a milling action on the plastic mass whilst the contour of the raised portion produces a kneading action the contour of the raised portion being such as to exert an impelling action on the plastic mass to traverse it endwise of the casing and to re-present it to the action of the rollers, substantially as described.

3. Rubber preparing machinery comprising a casing formed with partially circular troughs a plurality of rollers rotatably mounted in said casing and formed with raised surfaces in the form of spirals extending from end to end of the rollers and of comparatively large area the peripheral face of said raised area being substantially concentric with the axis of the rollers for the whole or major portion of its area and with the circular walls of the casing and extending substantially to the reduced diameter of the body part of the rollers said body part also being substantially concentric with the axis thereof the arrangement being such that the outer periphery of said raised portions in their passage across the body part of the adjacent roller exerts a milling action on the plastic mass whilst the contour of the raised portion produces a kneading action the contour of the raised portion being such as to exert an impelling action on the plastic mass to traverse it endwise of the casing and to re-present it to the action of the roller, substantially as described.

4. Rubber preparing machinery comprising a casing formed with partially circular troughs a plurality of rollers rotatably mounted in said casing and formed with raised surfaces in the form of spirals extending from end to end of the rollers and of comparatively large area the peripheral face of said raised area being substantially concentric with the axis of the rollers for the whole or major portion of its area and with the circular walls of the casing and extending substantially to the reduced diameter of the body part of the rollers said body part also being substantially concentric with the axis thereof the arrangement being such that the outer periphery of said raised portions in their passage across the body part of the adjacent roller exerts a milling action on the plastic mass whilst the contour of the raised portion produces a kneading action the contour of the raised portion being such as to exert an impelling action on the plastic mass to traverse it endwise of the casing and to re-present it to the action of the roller, an inlet hopper at the top of the casing and an outlet door at the bottom of the casing, substantially as described.

5. Rubber preparing machinery comprising a casing formed with two partially circular troughs two rollers rotatably mounted in said casing and formed with raised surfaces in the form of spirals extending substantially from end to end of the rollers and of comparatively large area the peripheral face of said raised area being substantially concentric with the axis of the rollers for the whole or major portion of its area and with the circular walls of the casing and extending substantially to the reduced diameter of the body part of the rollers said body part also being substantially concentric with the axis thereof the arrangement being such that the outer periphery of said raised portions in their passage across the body part of the adjacent roller exerts a milling action on the plastic mass whilst the contour of the raised portion produces a kneading action the contour of the raised portion being such as to exert an impelling action on the plastic mass to traverse it endwise of the casing and to re-present it to the action of the rollers, substantially as described.

6. Rubber preparing machinery comprising a casing formed with two partially circular troughs two rollers rotatably mounted in said casing and formed with raised surfaces in the form of spirals extending substantially from end to end of the rollers and of comparatively large area the peripheral face of said raised area being substantially concentric with the axis of the rollers for the whole or major portion of its area and with the circular walls of the casing and extending substantially to the reduced diameter of the body part of the rollers said body part also being substantially concentric with the axis thereof the arrangement being such that the outer periphery of said raised portions in their passage across the body part of the adjacent roller exerts a milling action on the plastic mass whilst the contour of the raised portion produces a kneading action the contour of the raised portion being such as to exert an impelling action on the plastic mass to traverse it endwise of the casing and to represent it to the action of the rollers, the casing being provided with an inlet hopper at the top and an outlet door at the bottom, substantially as described.

RUPERT THOMAS COOKE.